United States Patent [19]

Liparoto et al.

[11] Patent Number: 5,255,708

[45] Date of Patent: Oct. 26, 1993

[54] METHOD AND APPARATUS FOR FILLING MOTORCYCLE FORKS

[75] Inventors: Anthony G. Liparoto, 6528 Flynn, NW., Albuquerque, N. Mex. 87120; Dominic Liparoto, Albuquerque, N. Mex.

[73] Assignee: Anthony G. Liparoto, Albuquerque, N. Mex.

[21] Appl. No.: 819,382

[22] Filed: Jan. 10, 1992

[51] Int. Cl.$^5$ .............................................. B65B 3/00
[52] U.S. Cl. .............................. 141/67; 141/21; 141/25; 141/27; 141/363; 141/375; 141/391; 222/400.8
[58] Field of Search .............. 222/401, 209, 400.8; 141/21, 23, 24, 25, 26, 27, 28, 67, 363, 365, 366, 368, 375, 391

[56] References Cited

U.S. PATENT DOCUMENTS

| | | |
|---|---|---|
| 494,467 | 3/1893 | Donathen ............... 222/209 X |
| 806,095 | 12/1905 | Barrow . |
| 1,106,937 | 8/1914 | Goff ............................. 222/401 |
| 1,478,267 | 12/1923 | Thompson ................. 222/209 |
| 1,708,740 | 4/1929 | Tanner ......................... 222/401 |
| 1,834,453 | 12/1931 | Gavaza . |
| 2,290,594 | 7/1942 | Keith ..................... 222/401 X |
| 2,337,738 | 12/1943 | Christensen . |
| 2,539,841 | 1/1951 | Katz . |
| 2,933,376 | 4/1960 | McBrien ................. 141/24 X |
| 3,010,614 | 11/1961 | Udy ........................ 222/209 X |
| 3,039,500 | 6/1962 | Goldberg ..................... 141/26 |
| 3,455,349 | 7/1969 | Greenwood et al. . |
| 4,182,384 | 1/1980 | Zehr ..................... 141/363 X |

FOREIGN PATENT DOCUMENTS

| | | |
|---|---|---|
| 76488 | 3/1921 | Fed. Rep. of Germany ... 222/400.8 |
| 873661 | 4/1953 | Fed. Rep. of Germany ...... 222/209 |
| 3540984 | 5/1987 | Fed. Rep. of Germany ...... 222/209 |
| 1143476 | 10/1957 | France ................................ 222/209 |
| 418307 | 10/1974 | United Kingdom ................ 222/209 |

OTHER PUBLICATIONS

*Motocross*, Sep. 1991, advertisement for "Pro-Level" (no page given).
*Dirt Bike*, Dec. 1991, p. 29.

Primary Examiner—Ernest G. Cusick
Attorney, Agent, or Firm—Donovan F. Duggan; Deborah A. Peacock

[57] ABSTRACT

Apparatus and method for filling motorcycle front forks comprising, a horizontally planar platform for positioning proximate a motorcycle front fork. Mounted upon the platform are a tubular, vertically adjustable dipstick, a hand pump and a reservoir. The dipstick is vertically adjusted to the correct level of fork fluid in the reservoir. The front fork is then overfilled with fork fluid. Excess fork fluid is then pumped out of the fork by the hand pump into the reservoir. Flow of fork fluid automatically ceases when the correct level of fork fluid is attained because the end of the dipstick will then be above the level of fork fluid in the motorcycle front fork.

9 Claims, 2 Drawing Sheets

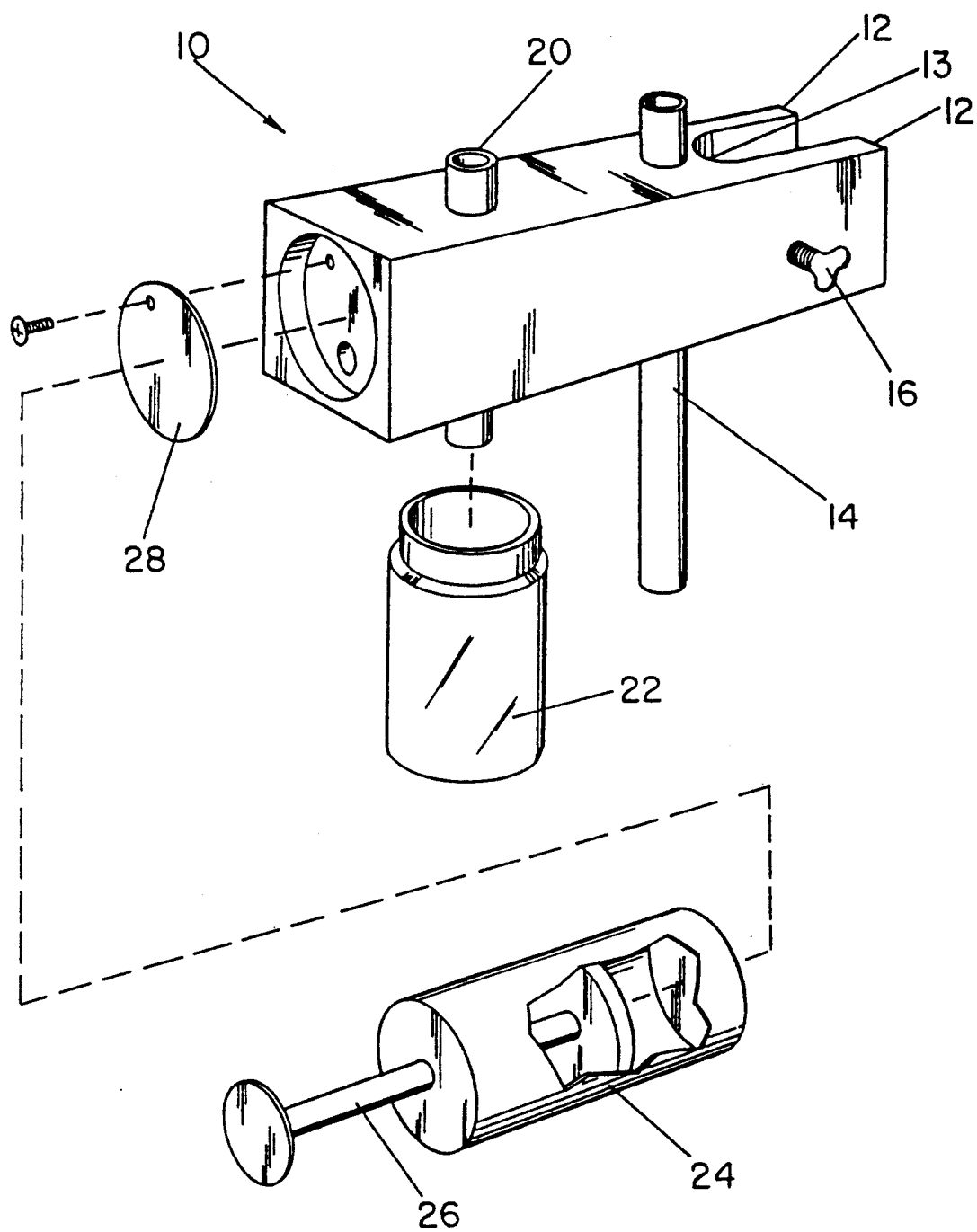
FIG—4

METHOD AND APPARATUS FOR FILLING MOTORCYCLE FORKS

BACKGROUND OF THE INVENTION

1. Field of the Invention (Technical Field)

The present invention relates to an apparatus for accurately filling motorcycle front forks with fork oil, and a method for its use.

2. Background Art

Motorcycles, particularly used in the off-road riding sports of motocross, enduro, observed trials, hillclimbing, trail and desert riding, are typically small-displacement machines subjected to tremendous shock and torque. These "dirt-bikes" negotiate terrain virtually impassable to other vehicles. Consequently, proper operation of their suspension systems is critical to good performance and control sensitivity; the problems of suspension friction and stiction mandate proper maintenance of dirt bike suspension systems. Among essential maintenance requirements of dirt bike suspension systems is frequent and accurate filling of their front forks.

U.S. Pat. No. 806,095, to Barrow, entitled Bottle Filling Device, discloses a bottle filling device for filling a bottle with corrosive or noxious liquids, and a closure for such bottles. There is no disclosure in Barrow relating to accurate measurement of the filling liquid or use other than filling bottles.

Similarly, U.S. Pat. No. 1,834,453, to Gavaza, entitled Bottle Filling Device, discloses a device wherein fluid flow is initiated by normally squeezing a bulb to create suction. Again, there is no disclosure relating to accurate measurement of the filling fluid or adaptation to motorcycle use.

U.S. Pat. No. 2,539,841, to Katz, entitled Shock Absorber, discloses an aircraft shock absorber of telescopic structure. The device, while apparently presenting great flexibility and capacity, is not designed for motorcycle use. Likewise, U.S. Pat. No. 2,337,738, to Christiansen, entitled Double-Acting Shock Brake, discloses a telescoping shock absorber structure, but is devoid of disclosure relating to motorcycle usage or accurately refilling the absorber with fluid.

U.S. Pat. No. 3,455,349, to Greenwood, et al., entitled Fluid Filters and Apparatus for Bleeding Hydraulic Systems, discloses a hydraulic fluid air bleeding device comprising squeeze bottles and a brake fluid replacement reservoir. Significantly, precision measurement of replacement hydraulic fluid is disclosed.

In Dirt Bike, Vol. 21, No. 12, pp. 28-29, December 1991, the use of a medical syringe for replenishing motorcycle fork oil is disclosed. Manifestly lacking is an adequate reservoir of fork oil as well as a stable refilling platform.

Applicant has discovered that motorcycle forks can be filled more accurately by first overfilling the fork with fluid, then slowly withdrawing the excess of fluid to the exact amount required. Merely filling to the required amount tends to introduce inaccuracies and overfilling.

SUMMARY OF THE INVENTION

Disclosure of the Invention

In accordance with the preferred embodiment of the invention, there is provided an apparatus for accurately measuring and filling motorcycle front forks. The preferred apparatus comprises a platform with a tubular dipstick adjustably mounted on the platform. A receptacle for storing fork fluid is mounted upon the platform, as is a hand pump for pumping fork fluid through the tubular dipstick to the receptacle for storing fork fluid.

The platform further comprises a notch or cutout for accurately locating the platform upon the front fork; the tubular dipstick further comprises indicia mounted thereon. The platform further comprises a flapper valve for preventing diminution of vacuum within the receptacle for storing fork fluid. The platform may further comprise nonmetallic material.

The preferred method of the invention comprises the steps of positioning the platform proximate a motorcycle fork to be accurately filled, adding an excess of fork fluid to the fork, and thereafter accurately withdrawing the excess of fork fluid to the correct level of fork fluid. The preferred method of the invention further comprises the steps of vertically adjusting a tubular dipstick in the motorcycle fork, horizontally locating the platform upon the front fork, and pumping the excess of fork fluid.

Accordingly, it is an object of the invention to provide a simple but effective motorcycle front fork filling apparatus.

It is another object of the invention to provide a fork filling apparatus which is accurate and fast in operation.

Yet another object of the invention is to provide a method of filling motorcycle front forks which is fast, accurate, and simple to execute.

An advantage of the invention is its simplicity and ease of operation.

Another advantage of the invention is its ease of fabrication and maintenance.

Yet another advantage of the invention is the relative inexpensiveness of the components.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 4 is an articulated view of the preferred apparatus of the invention.

DESCRIPTION OF THE PREFERRED EMBODIMENTS

Figure 1:
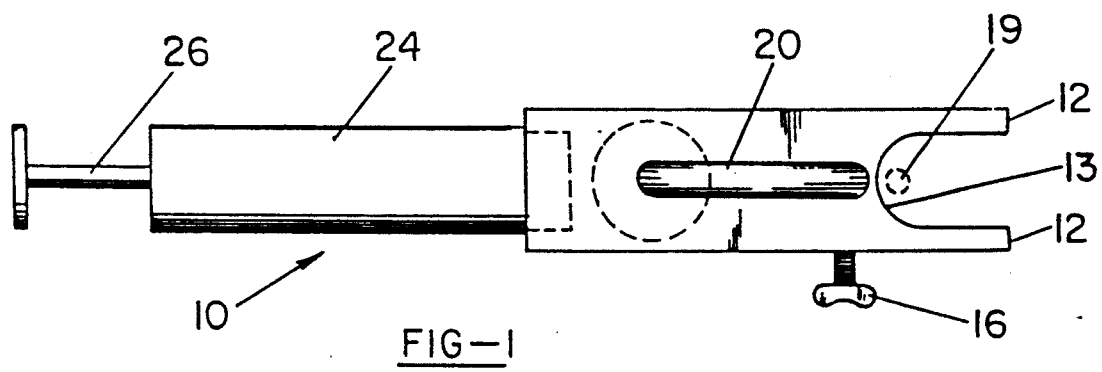
FIG. 1 is a top view of the preferred apparatus of the invention.
Figure 2:
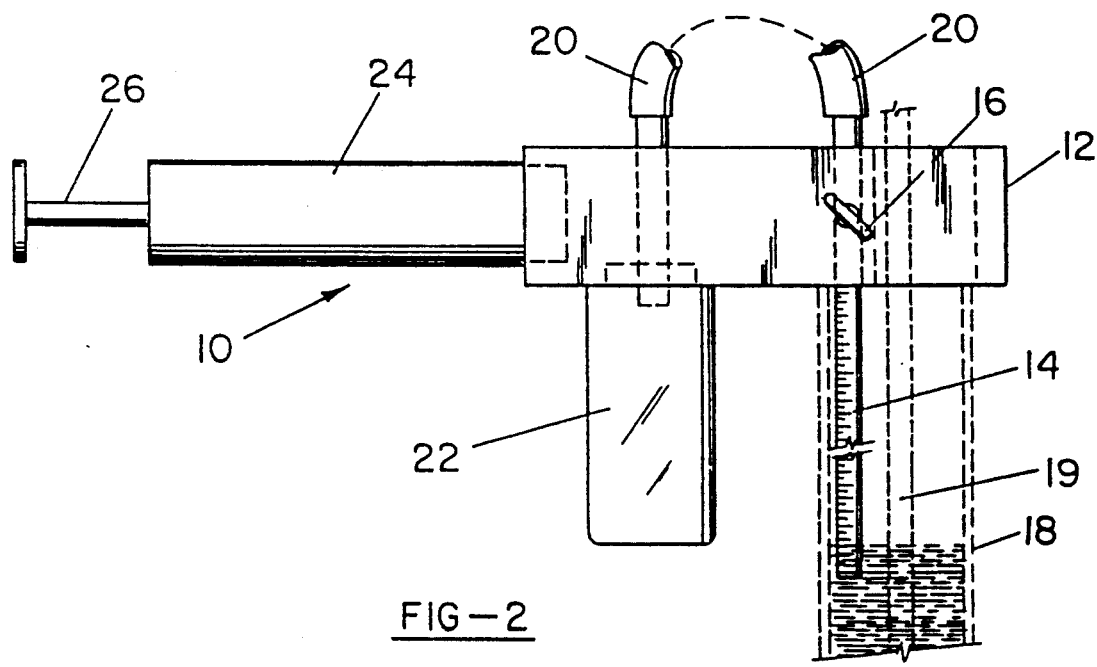
FIG. 2 is a phantom side view of the preferred apparatus of the invention.

Best Modes for Carrying Out the Invention

FIGS. 1-4 depict the preferred apparatus of the invention. Typically, prior to filling, the front forks of off-road motorcycles are removed from the motorcycle, drained, collapsed, and placed in an upright position. Fork filling apparatus 10 of the invention typically fits squarely upon, orthogonally to, and over the front fork to be filled and comprises base or platform 12. Base or platform 12 may comprise metal, wood, cardboard, nylon, PVC, polycarbonate, or other plastic materials, including both thermoplastic and thermosetting plastics. Preferably, however, base 12 is of a nonmetallic material. Typically, the dimensions of base or platform 12 may comprise a length of 5", width of 2.5", and a height of 2". These dimensions are only approximate and may be varied so platform 12 fits squarely upon and orthogonally to the top of the front forks of any given motorcycle model in horizontally planar configuration.

Apparatus 10 further comprises tubular dipstick 14 vertically adjustable through base or platform 12 into motorcycle fork 18, thereby accommodating the specific depths of various fork models, including both cartridge and telescopic front forks.

In the case of cartridge forks, notch or cutout 13 is provided to accommodate the cartridge 19 protruding upwardly from the center of and above the plane of the top of fork 18, thereby assuring accurate positioning and placement of apparatus 10 vis-a-vis front fork 18. Dipstick 14 is thereby positioned between cartridge 19 and the side wall of fork 18. Tubular dipstick 14 is preferably translucent or transparent and secured in the proper vertical position by locking screw 16. Dipstick 14 is further provided with indicia thereon to correctly indicate and provide a reference for any specified amount of fork fluid within fork 18 (for example, indicia indicating 130-150 mm for a 250 cc displacement motocross motorcycle).

Apparatus 10 further comprises tubing 20 which also is preferably transparent or translucent. Tubing 20 connects tubular dipstick 14 to reservoir 22 for free flow of fluid therebetween. Reservoir 22 preferably may comprise a glass jar, can, or any other appropriate container secured to platform 12 by any means well known in the art.

Figure 3:
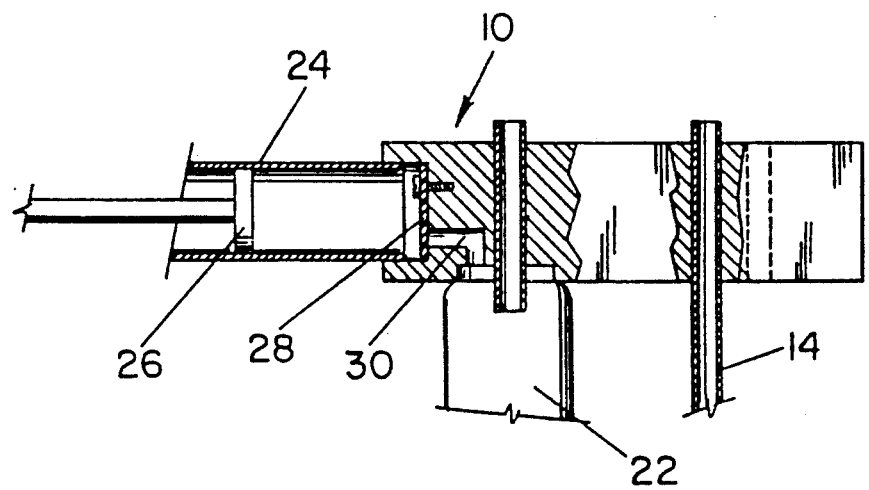
FIG. 3 is a side cross-section view of the preferred apparatus of the invention.

In operation, and as better depicted in FIGS. 3 and 4, front fork 18 is first overfilled beyond its proper volume with fork fluid. Tubular dipstick 14 is vertically adjusted and fixed in position by locking screw 16 so as to extend downwardly below base or platform 12, thereby indicating the correct depth of fork fluid by the exposed indicia thereon. A partial vacuum is then applied to reservoir 22 and tubing 20 by operation of hand pump 24. Outward withdrawal of plunger 26, and consequent opening of flapper valve 28, acts to create a partial vacuum through channel 30, and in reservoir 22. Fork fluid then flows from overfilled front fork 18 to reservoir 22. Slow withdrawal of plunger 26 permits a highly accurate and correct volume of fork fluid to be gauged and retained within front fork 18.

Further, of course, flow will automatically cease upon reaching the correct setting of dipstick 14 because the end of dipstick 14 will then be above the fork fluid level. Flapper valve 28 assures no diminution or reduction in the partial vacuum created in reservoir 22. This further assures that further pumping, if required, will be uniformly and evenly applied.

In summary, the invention disclosed herein relates to a method and apparatus for motorcycle fork filling that first requires overfilling of the fork, then slow and accurate withdrawal of excess fork fluid. Such method and apparatus result in more accurate measurement and amount of fork fluid added, in contrast to attempting to correctly fill the fork by merely adding the correct amount of fluid in the first instance.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. Apparatus for accurately measuring and filling motorcycle front forks comprising:
    means comprising a horizontally planar platform for mounting proximate a motorcycle front fork;
    means adjustably mounted on said means comprising a horizontally planar platform for measuring fork fluid within a motorcycle front fork;
    means mounted on said means comprising a horizontally planar platform for storing said fork fluid; and
    means mounted on said means comprising a horizontally planar platform for pumping said fork fluid through said means for measuring said fork fluid to said means for storing said fork fluid.

2. The invention of claim 1 wherein said means comprising a horizontally planar platform further comprises means for accurately locating said means comprising a horizontally planar platform upon the front fork of a motorcycle.

3. The invention of claim 2 wherein said means for accurately locating said means comprising a horizontally planar platform comprises a notch.

4. The invention of claim 1 wherein said means adjustably mounted on said means comprising a horizontally planar platform for measuring said fork fluid comprises a tubular dipstick.

5. The invention of claim 4 wherein said tubular dipstick further comprises indicia mounted thereon.

6. The invention of claim 1 further comprising tubing connecting said means for measuring the amount of said fork fluid to said means for storing said fork fluid.

7. The invention of claim 1 wherein said means for pumping said fork fluid comprises a hand pump.

8. The invention of claim 7 wherein said means comprising a horizontally planar platform further comprises a flapper valve mounted thereon to prevent diminution of vacuum within said means for storing fork fluid.

9. The invention of claim 1 wherein said means comprising a horizontally planar platform is made of a nonmetallic material.

* * * * *